US007049539B2

(12) United States Patent
Uno et al.

(10) Patent No.: US 7,049,539 B2
(45) Date of Patent: May 23, 2006

(54) METHOD FOR SURFACE TREATING A DIE BY ELECTRON BEAM IRRADIATION AND A DIE TREATED THEREBY

(75) Inventors: Yoshiyuki Uno, Okayama (JP); Akira Okada, Okayama (JP); Kensuke Uemura, Kamakura (JP); Raharjo Purwadi, Niigata (JP)

(73) Assignee: Nagata Seiki Kabushiki Kaisha, Tokyo (JP)

( * ) Notice: Subject to any disclaimer, the term of this patent is extended or adjusted under 35 U.S.C. 154(b) by 228 days.

(21) Appl. No.: 10/400,602

(22) Filed: Mar. 27, 2003

(65) Prior Publication Data

US 2003/0183743 A1 Oct. 2, 2003

(30) Foreign Application Priority Data

Apr. 1, 2002 (JP) ............................ 2002-099030

(51) Int. Cl.
*B23P 9/00* (2006.01)

(52) U.S. Cl. .......................... 219/121.35; 219/121.36; 219/121.21; 249/135

(58) Field of Classification Search ............ 400/492.3; 249/135; 204/192.11; 148/239; 219/121.36, 219/121.35, 121.21, 121.12
See application file for complete search history.

(56) References Cited

U.S. PATENT DOCUMENTS 5,859,404 A * 1/1999 Wei et al. .............. 219/121.43
6,863,531 B1 * 3/2005 Kensuke et al. ......... 433/200.1

* cited by examiner

*Primary Examiner*—Donald Heckenberg
(74) *Attorney, Agent, or Firm*—Jordan and Hamburg LLP

(57) ABSTRACT

Method for surface treating a die made of metal in which a low energy, pulsed electron beam, which does not scatter, performs a treatment over a wide area due to presence of anode plasma in a chamber in which the electron beam is formed to smooth and gloss a surface of the die and increase a surface hardness and corrosion resistance of the die. The irradiation may be performed with an energy density not less than 1 J/cm$^2$ per pulse, at least 5 pulse irradiations and a pulse duration of at least 1 μs. A die subjected to the surface treatment method exhibits improved surface smoothness and glossiness, as well as high corrosion resistance.

10 Claims, 5 Drawing Sheets

Workpiece; Prehardened steel (NAK80)
EDM conditions; $i_e$=3A, $t_e$=2μs, τ=10%, Electrode; Cu(+)
EB conditions; Energy density 7.3J/cm$^2$, Pulse duration 2-3 μs, Pulse freqency 0.2Hz, Number of pulse 30

SK3

Note:
Number of measurements : 5 times for each point
Holding time : 10s
Cross head speed : 1 μm/s

SKD61

Note:
Number of measurements : 5 times for each point
Holding time : 10s
Cross head speed : 1 μm/s SUPER HARD METAL ALLOY WC-Co

METHOD FOR SURFACE TREATING A DIE BY ELECTRON BEAM IRRADIATION AND A DIE TREATED THEREBY

FIELD OF THE INVENTION

The present invention relates generally to a die material and a method for fabricating the material and more particularly to a method for surface treating a die in a fabrication process using an electron beam.

BACKGROUND OF THE INVENTION

In the molding die industry, the material used for the die is required to have certain characteristics, namely, a high hardness to ensure sufficient strength and abrasion resistance needed to enable it to be used in products such as a die, and excellent machinability.

Conventionally, a prehardened steel is used as the die material. For the prehardened steel, the typical processes used to increase the strength (hardness) of ordinary steel such as annealing, machining, and quenching are not employed. Rather the steel is adjusted to a predetermined hardness and machined without the quenching treatment and then used for the die.

A particular prehardened steel, increased in hardness using precipitation hardening with the addition of Ni, Al, and Cu, is modified to have a bainite structure which is highly machinable, and as such, is useful as a steel which provides an improved hardness and comparatively good machinability. The steel is not required to be subjected to any quenching treatment after machining, and thus highly usable for die makers.

However, even if a highly machinable material is obtained, in order to machine a die having a complicated shape, an electric discharge machining is indispensable, as well as a laser machining, for example. Particularly, the electric discharge machining is used for an ultraprecise die specified for use in the fabrication of semiconductor components.

Also, the electric discharge machining enables the formation of a die regardless of the machinability, for example even for materials with poor machinability, and cemented carbide such as WC—Co, SK-3, and SKD61.

Although electric discharge machining is widely used for machining precise dies because it is usable for machining material having poor machinability and high hardness, it is actually uncommon to use the surface subjected to the electric discharge machining as it is without further surface treatment, and a polishing finish by manual polishing is typically subsequently performed to reduce the surface roughness, eliminate defects in a surface layer such as a microcrack, and improve the accuracy of the form. However, this process largely depends on the skill of a skilled worker and requires a long time, and therefore it would be desirable to improve the operational efficiency of the process.

OBJECTS AND SUMMARY OF THE INVENTION

It is an object of the present invention to overcome the problem in the prior art of the need to manually polish a die subjected to electric discharge machining, and also to achieve a finish with a reduced surface roughness in a short time.

The invention provides a solution to this problem by using an electron beam irradiation process so that it is no longer necessary to manually polish a die subjected to electric discharge machining while obtaining a finish with a reduced surface roughness in a short time.

The apparatus used in the invention can be applied to improve the corrosion resistance of a surface, glossing, to improve fatigue characteristics and to adjust the hardness of various metals such as a die and denture plate. With anode plasma present in the apparatus, there is no electron beam scattering as appears frequently in a vacuum, and a surface modification of metals can be provided over a wider area than in the surface machining by the laser. Therefore, the apparatus is especially suitable for surface modification of a die.

In one embodiment of the method for surface treating a die, anode plasma is generated in a chamber and a low energy, pulsed electron beam is formed in the chamber, the electron beam being directed over a wide area in view of the presence of the anode plasma. A die of carbon steel is placed in the path of the electron beam such that the electron beam smooths and glosses a surface of the die material and increases the surface hardness of the carbon steel. The electron beam is formed to avoid electron beam scattering in view of the presence of the anode plasma.

The parameters of operation of the electron beam can be varied within the operational guidelines of the electron beam. However, it has been found that using an energy density not less than 1 J/cm$^2$, a pulse duration of at least 1 μs and at least 5 pulsed irradiations provides a smooth, hard die. Preferred energy densities are greater than 2 J/cm$^2$, about 4.2 J/cm$^2$, about 7.3 J/cm$^2$, from about 2 J/cm$^2$ to about 8 J/cm$^2$ and from about 6 J/cm$^2$ to about 7 J/cm$^2$.

A surface-hardened die in accordance with the invention has a smooth and glossy surface formed by generating anode plasma in a chamber, forming a low energy, pulsed electron beam in the chamber, and placing a die material of carbon steel in the path of the electron beam such that the electron beam smooths and glosses a surface of the die material and increases the surface hardness of the carbon steel. The die material may be prehardened steel such as that designated NAK80 by Daido Steel, the steel designated SK3, the steel designated SKD61 and the cemented carbide designated WC—Co.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE PREFERRED EMBODIMENTS

Figure 1:
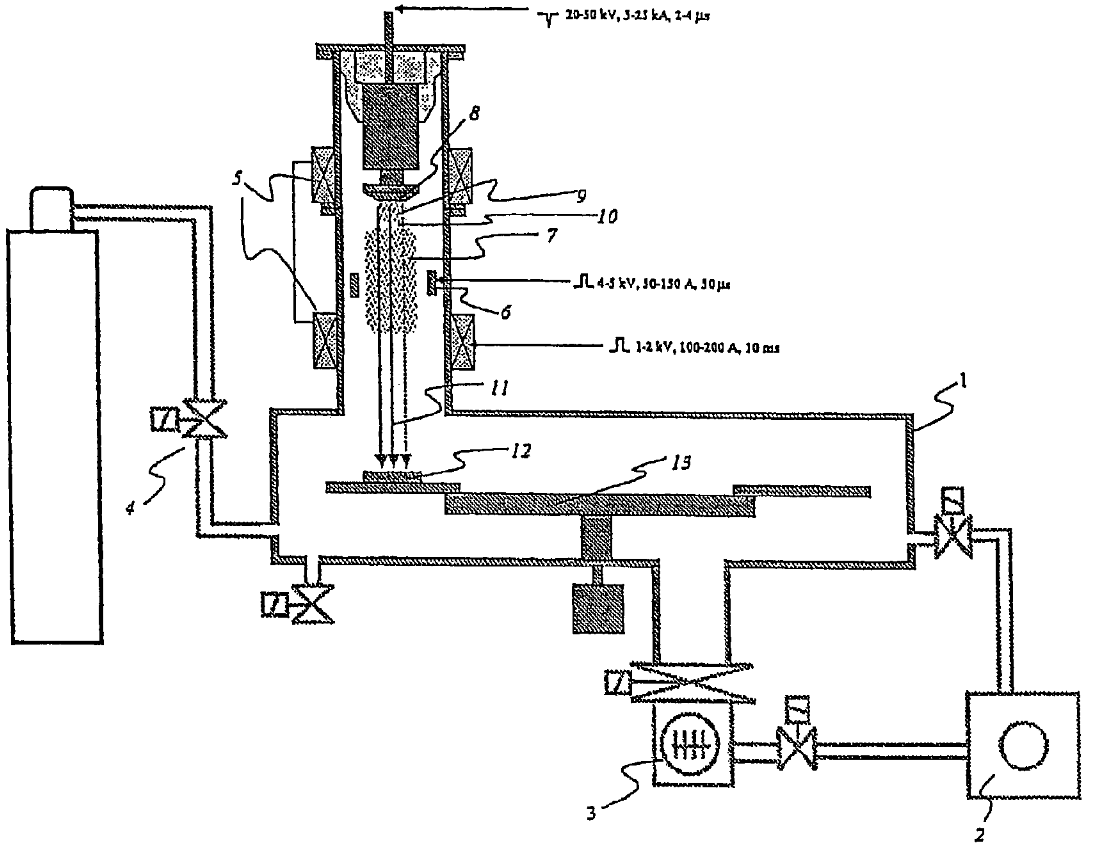
FIG. 1 shows a low energy, pulsed electron beam apparatus used in methods in accordance with the invention that enables radiation to be applied over a wide area.

Referring to the accompanying drawings wherein like reference numerals refer to the same or similar elements, a low energy, high current density electron beam apparatus used in a method in accordance with the invention will be described with reference to FIG. 1 from U.S. patent application Publication Ser. No. 2003/0019850 A1 by Kensuke UEMURA et al. published on Jan. 30, 2003, which is incorporated by reference herein.

The apparatus includes a vacuum chamber 1 in which a die 12 is placed. The vacuum chamber 1 is exhausted from atmospheric pressure to about $3\times10^{-2}$ Pa or less by a pumping mechanism such as a scroll pump 2 and a turbo molecular pump 3. An inert gas is introduced into the vacuum chamber 1 through a valving mechanism such as a flow control valve 4. When the pressure within the vacuum chamber 1 becomes steady at a certain pressure from about 0.5 to $3\times10^{-1}$ Pa, an electric current is momentarily passed through a solenoid 5 provided outside an electric gun, and a strong, pulsed, magnetic field is generated in the electric gun.

At the same time as the magnetic field is generated, a positive pulse voltage (about 5 kV) is applied to a ring-shaped anode 6 to accelerate natural electrons within the vacuum chamber 1. The ring-shaped anode 6 may also be referred to as an anode ring. Since the electrons exist in the electric and magnetic fields, the Penning effect occurs. The electrons receive the Lorenz force and move helically so that a path of the electrons is prolonged. Although the electrons are eventually collected by an anode, before such collection, the electrons collide with gas molecules many times and ionize the gas molecules, thereby generating an anode plasma 7 in the space adjacent to the ring-shaped anode 6. In this manner, ionization of the gas is induced and a high-density plasma is obtained.

When the amount of the generated anode plasma 7 reaches its maximum (about 20 μs to about 30 μs after the start of the voltage application on the anode 6), a negative-pulse accelerating voltage (about 20 kV to about 40 kV, pulse duration: about 2 μs to about 4 μs) is applied on the cathode 8 of the electronic gun. The rise time of the applied pulse voltage is set to about 5 ns to about 10 ns with a spark trigger switch. Further, the anode plasma 7 acts as a virtual anode, and thus the virtual distance between the anode 6 and cathode 8 is shorter than in the case without the plasma. In this manner, a very strong electric field is concentrated on the end of the sharp, needle-like surface of the cathode 8, and a high electric field is generated on the cathode surface. As such, electrons are emitted abruptly from the cathode 8, and a high-density cathode plasma 9 is generated adjacent to the cathode 8.

Since the cathode plasma 9 adjacent to the cathode 8 and the anode plasma 7 around the anode 6 are generated, a double layer 10 is formed between both plasmas 7,9. The plasmas 7,9 have a high conductivity and each serves like a negative or positive electrode. Since the space between both virtual electrodes comprises the narrow double layer, a high electric field is concentrated between the electrodes, and the electrons ejected from the cathode plasma 9 are accelerated by the high electric field across the layer. In this manner, a high-density electron beam 11 is formed. The high-density electron beam 11 irradiates the die 12.

EXAMPLES

Example 1

Using a prehardened steel (DAIDO STEEL designation NAK80) as the die material, an electron beam (electron density: about 7.3 J/cm$^2$, pulse duration: about 2 μs to about 3 μs, pulse frequency: about 0.2 Hz, pulse number: about 30, and beam diameter: about 80 mm) was irradiated on a surface of the die material on which the electric discharge machining had been carried out with a discharge current of about 3 A, pulse width of about 2 μs, and duty factor of about 10% using a copper electrode (diameter of about 10 mm) (working fluid: kerosene-based). Steels contain carbides elongated along the rolling direction, and thus properties of the steels vary with the direction. Therefore, two different directions were prepared.

Figure 2:
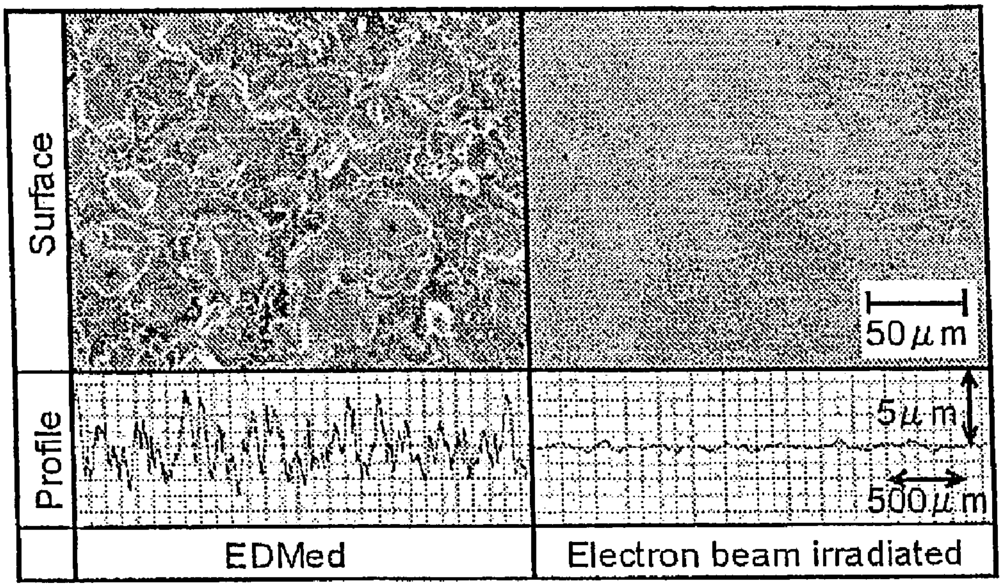
FIG. 2 shows the change of the surface roughness of the die of the prehardened steel subjected to electron beam irradiation in accordance with the invention.

As shown in FIG. 2, on the surface of the steel, there are numerous discharge marks several tens of micrometers in diameter before irradiation (the surface picture and profile on the left), whereas the discharge marks are not present and the roughness is considerably improved in the surface after irradiation (the surface picture and profile on the right).

Example 2

Figure 3:
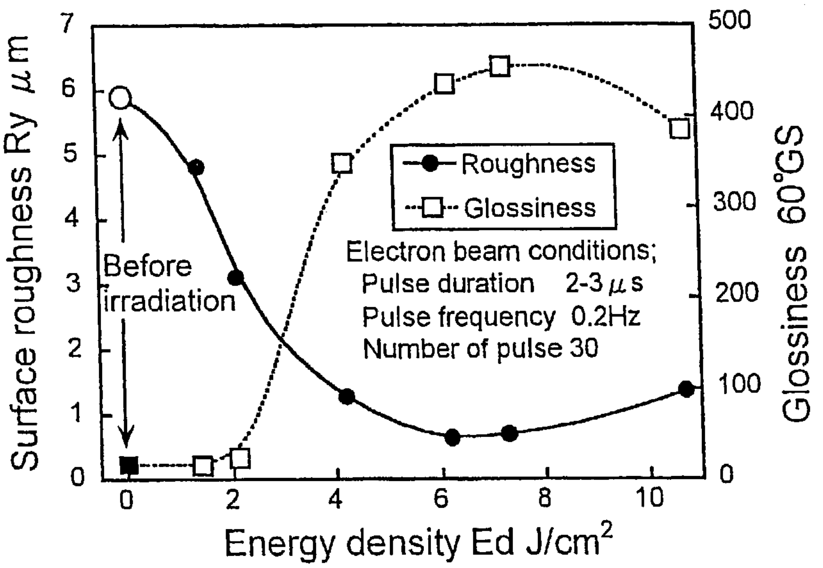
FIG. 3 shows the change of the surface roughness and glossiness of the irradiated die of the prehardened steel with varying density of the electron beam formed by a method in accordance with the invention.

Next, electron beams of various energy densities were directed to a surface of the die material which had been subjected to electric discharge machining. FIG. 3 shows changes of the roughness and glossiness of the surface of the die material with varying energy densities. The surface roughness (Ry-measured in μm) decreases abruptly in a range of the energy density (Ed) from about 1 J/cm$^2$ to about 4 J/cm$^2$, and is at a minimum in a range from about 6 J/cm$^2$ to about 7 J/cm$^2$, while it increases somewhat with further increases in the energy density. The change in glossiness (Glossiness being measured in accordance with standard JIS Z 8741) shows good correspondence with changes in the surface roughness, and the maximum glossiness was obtained when the surface roughness was at a minimum. From the results shown in FIG. 3, it is seen that the smoothing effect increases up to a certain point with an increase in the energy density.

Example 3

Figure 4:
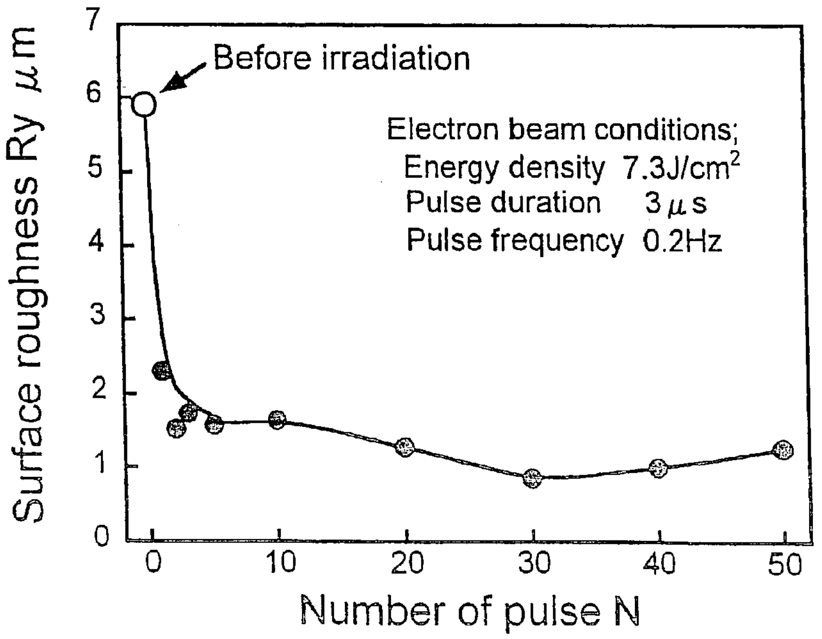
FIG. 4 shows the change of the surface roughness of the irradiated die of the prehardened steel with increasing numbers of electron beam pulses formed by a method in accordance with the invention.

The change of the surface roughness when the number of 7.3 J/cm$^2$ energy density electron beam irradiations is varied is shown in FIG. 4. In this case, the surface roughness (Ry-measured in μm)) abruptly decreases through succeeding irradiations, and does not significantly vary after 5 irradiations. A similar tendency was found where the energy density is about 4.2 J/cm$^2$. It is thus apparent that for each energy density, there will likely be a number of irradiations after which the surface roughness does not vary significantly. Prior to reaching this number of irradiations, each irradiation will affect the surface roughness.

Example 4

It is possible in a carbon steel that a martensitic transformation is induced and applied for the surface hardening. After a die made of the steel designated SK3 (about 1% to about 1.1% C) had been subjected to the irradiation of the pulsed electron beam (about 6 $J/cm^2$) 20 times in accordance with the invention, the surface hardness was increased.

Figure 5:
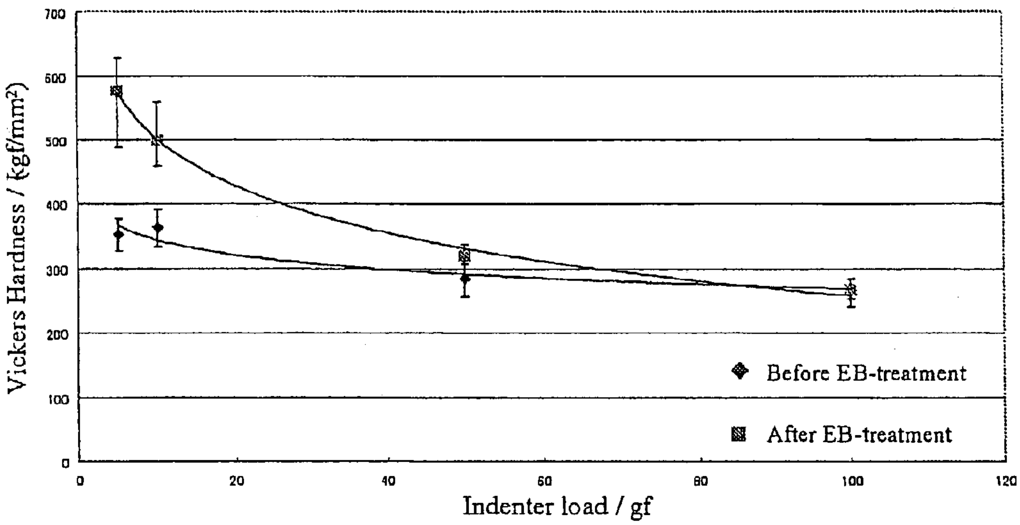
FIG. 5 shows the change of surface hardness of a die of the steel designated SK3 subjected to the electron beam irradiation in accordance with the invention.

FIG. 5 shows respective data of surface hardness, obtained using a microhardness tester, before and after electron beam (EB) treatment. In the Vickers Hardness Test, a load is placed on a diamond indenter with a variable indenter load (gf), and hardness is calculated from a depression on a sample surface. Therefore, with a light load, the effect of the hardness of a substrate is slight, and the Vickers Hardness ($kgf/mm^2$) approximates the actual surface hardness. For the measurements, the load is desirably as low as possible.

Figure 6:
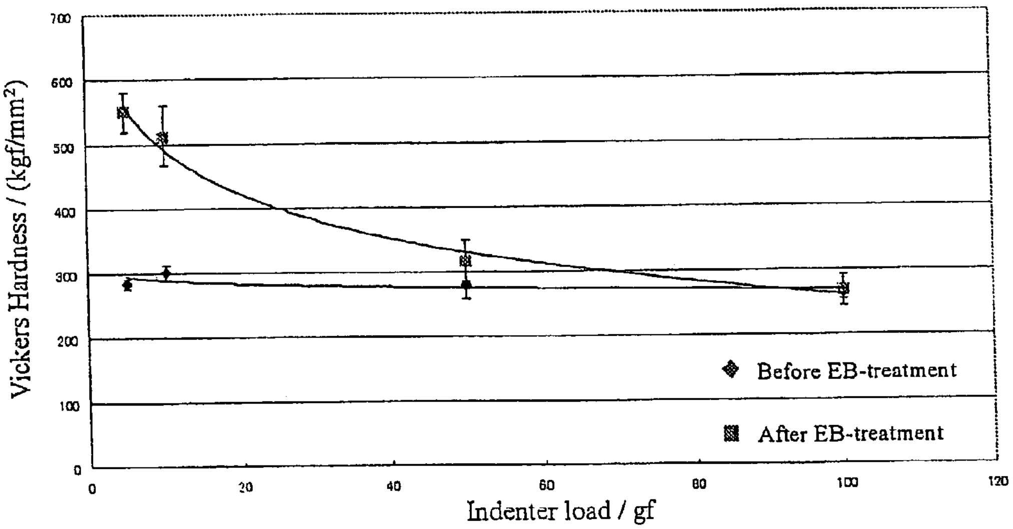
FIG. 6 shows the change of surface hardness of a die of the steel designated SKD61 subjected to the electron beam irradiation in accordance with the invention.

As shown in FIG. 6, in the light load region, the Vickers Hardness ($kgf/mm^2$) is increased after the electron beam (EB) treatment, and in this case, it is seen that the surface hardness was increased about 1.5 times.

Similarly, when a die of the steel designated SKD61 (about 0.32% to about 0.42% C) was subjected to the electron beam irradiation in accordance with the invention, the surface hardness was also increased. FIG. 6 shows the surface hardness of the steel designated SKD61.

Example 5

For a die of the cemented carbide designated WC—Co (G5), in accordance with the invention, the electron beam was irradiated on a surface on which the electric discharge machining had been carried out with discharge current of about 3 A, pulse duration of about 2 μs, and duty factor of about 10% using a copper electrode (having a diameter of 10 mm) (working fluid: kerosene-based). In an examination of the smoothing effect attained by the beam irradiation, the energy density of the pulsed beam was set to about 7.3 $J/cm^2$, and the die was irradiated with pulse duration of about 2 μs to about 3 μs, pulse frequency of about 0.2 Hz, pulse number of about 30, and beam diameter of about 80 mm.

Figure 7:
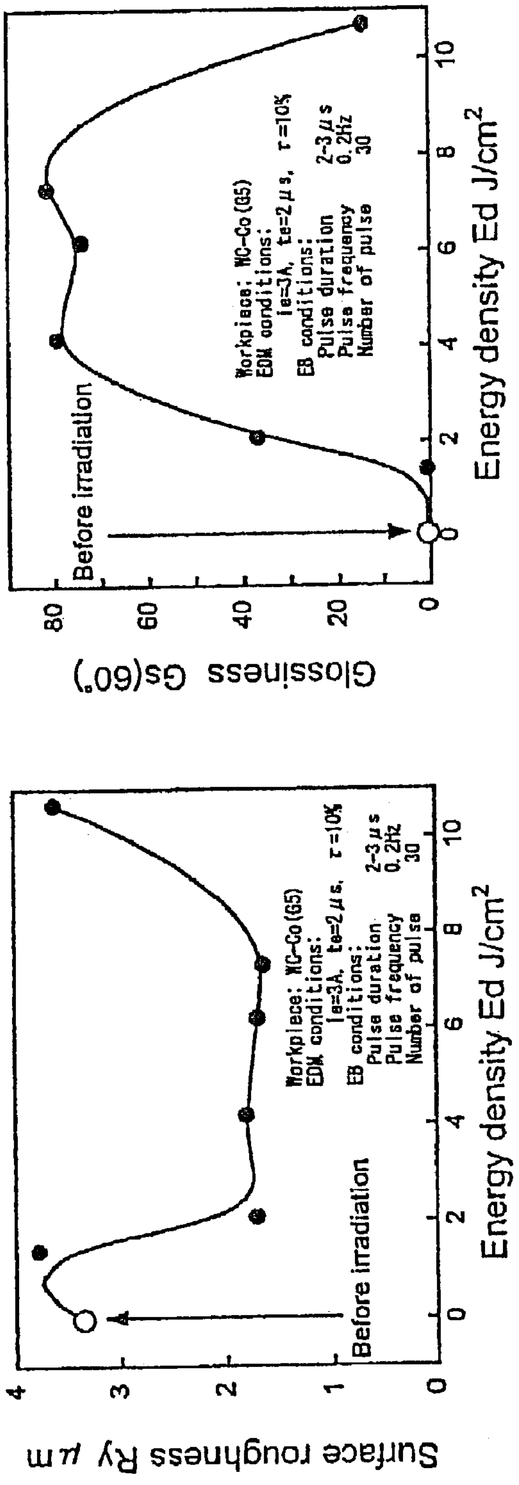
FIG. 7 shows the change of surface roughness and glossiness of a die of the cemented carbide designated WC—Co subjected to the electron beam irradiation in accordance with the invention.

As shown in FIG. 7, with the energy density of the pulsed beam from about 2 $J/cm^2$ to about 8 $J/cm^2$, the smoothing and glossing effects can be obtained.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A method for surface treating a die, comprising the steps of:

generating anode plasma in a chamber; then forming a low energy, pulsed electron beam in the chamber, the electron beam being directed over a wide area out of a generating region of the anode plasma in view of the presence of the anode plasma; and placing the die in the path of the electron beam out of a generating region of the anode plasma such that the electron beam smooths and glosses a surface of the die material and increases surface hardness of the die.

2. The method of claim 1, wherein the electron beam is formed to avoid electron beam scattering.

3. The method of claim 1, wherein the step of forming the electron beam comprises the steps of using an energy density of about 2 $J/cm^2$, a pulse duration of at least 1 μs and at least 5 pulsed irradiations.

4. The method of claim 1, wherein the step of forming the electron beam comprises the steps of using an energy density of about 7.3 $J/cm^2$, a pulse duration of at least 1 μs and at least 5 pulsed irradiations.

5. The method of claim 1, wherein the step of forming the electron beam comprises the steps of using an energy density of from about 6 $J/cm^2$ to about 7 $J/cm^2$.

6. The method of claim 1, wherein the step of forming the electron beam comprises the steps of using an energy density of about 4.2 $J/cm^2$ and at least 5 pulsed irradiations.

7. The method of claim 1, wherein the step of forming the electron beam comprises the steps of using an energy density of about 7.3 $J/cm^2$ and at least 5 pulsed irradiations.

8. The method of claim 1, further comprising the step of reducing the pressure in the chamber to a pressure less than or equal to $3*10^{-2}$ Pa.

9. The method of claim 1, further comprising the step of introducing an inert gas into the chamber.

10. A method for surface treating a die made of metal, comprising the steps of:

providing a chamber;

disposing said die in said chamber;

disposing an anode and a cathode in said chamber, said anode and said cathode disposed above said metal and said cathode disposed above said anode;

disposing a solenoid exterior to said chamber and adjacent to said anode;

controlling said anode, said solenoid and said cathode for generating anode plasma and generating and directing a low energy, pulsed electron beam over a wide area in the presence of the anode plasma; and said die being disposed in the path of the electron beam such that the electron beam smooths and glosses a surface of the die material and increases surface hardness of the die.

* * * * *